(12) United States Patent
Ikawa et al.

(10) Patent No.: US 9,700,820 B2
(45) Date of Patent: Jul. 11, 2017

(54) METHOD FOR PRODUCING HONEYCOMB STRUCTURES

(71) Applicant: SUMITOMO CHEMICAL COMPANY, LIMITED, Tokyo (JP)

(72) Inventors: Hiroyuki Ikawa, Tsukuba (JP); Masahi Inoue, Niihama (JP); Teruo Komori, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 15/095,664

(22) Filed: Apr. 11, 2016

(65) Prior Publication Data

US 2016/0263507 A1  Sep. 15, 2016

Related U.S. Application Data

(63) Continuation of application No. 14/392,179, filed as application No. PCT/JP2014/064504 on May 30, 2014.

(30) Foreign Application Priority Data

Jun. 28, 2013  (JP) .................................. 2013-136587

(51) Int. Cl.
*B01D 50/00* (2006.01)
*B01D 39/20* (2006.01)
(Continued)

(52) U.S. Cl.
CPC ..... *B01D 46/0001* (2013.01); *B01D 46/2459* (2013.01); *B28B 1/08* (2013.01);
(Continued)

(58) Field of Classification Search
CPC . F01N 3/0222; F01N 2330/06; B28B 11/006; B28B 3/269; B01D 46/2451
See application file for complete search history.

(56) References Cited

U.S. PATENT DOCUMENTS 4,283,210 A   8/1981   Mochida et al.
4,293,357 A   10/1981  Higuchi et al.
(Continued)

FOREIGN PATENT DOCUMENTS

CN   1717271   1/2006
EP   2 939 808  11/2015
(Continued)

OTHER PUBLICATIONS

International Preliminary Report, in corresponding Application No. PCT/JP2014/064504, mailed Jan. 7, 2016, 2 pages.
(Continued)

*Primary Examiner* — Amber R Orlando
(74) *Attorney, Agent, or Firm* — Finnegan, Henderson, Farabow, Garrett & Dunner, LLP

(57) ABSTRACT

A plurality of inlet-side octagonal cells and outlet-side quadrangular cells partitioned by partition walls on an upper surface and a lower surface are opened in a green honeycomb molded body in which a plurality of through-holes partitioned from each other by the partition walls are open in an end surface of a columnar body. Four outlet-side quadrangular cells having a smaller opening area adjoin around one inlet-side octagonal cell through the partition walls. The partition walls are joined together and the inlet-side octagonal cells are opened while closing the outlet-side quadrangular cells on the inlet side and the outlet-side quadrangular cells are opened while closing the inlet-side octagonal cells on the outlet side in a particulate-matter-removing filter such as a diesel particulate filter.

6 Claims, 25 Drawing Sheets

(51) Int. Cl.
*B01D 39/14* (2006.01)
*B01D 39/06* (2006.01)
*B01D 46/00* (2006.01)
*B28B 1/08* (2006.01)
*B28B 11/00* (2006.01)
*B01D 46/24* (2006.01)
*B28B 1/093* (2006.01)

(52) U.S. Cl.
CPC ............ *B28B 1/093* (2013.01); *B28B 11/006* (2013.01); *B01D 2046/2481* (2013.01)

(56) References Cited

U.S. PATENT DOCUMENTS

| | | | | |
|---|---|---|---|---|
| 6,863,705 | B2* | 3/2005 | Ishihara | B01J 35/04 264/177.12 |
| 7,393,509 | B2* | 7/2008 | Yamaguchi | B01D 46/2459 422/168 |
| 8,062,603 | B2* | 11/2011 | Komori | B01D 46/2429 422/177 |
| 9,302,409 | B2* | 4/2016 | Uoe | B28B 11/006 |
| 2003/0041575 | A1* | 3/2003 | Ishihara | B01J 35/04 55/523 |
| 2003/0230080 | A1* | 12/2003 | Nakatani | B01D 46/0001 60/311 |
| 2004/0055264 | A1* | 3/2004 | Itoh | B01J 35/04 55/523 |
| 2004/0206062 | A1 | 10/2004 | Ichikawa | |
| 2004/0239011 | A1* | 12/2004 | Ishihara | B01D 46/0001 264/628 |
| 2006/0093784 | A1 | 5/2006 | Komori et al. | |
| 2006/0197252 | A1 | 9/2006 | Ishikawa et al. | |
| 2015/0376072 | A1 | 12/2015 | Inoue et al. | |

FOREIGN PATENT DOCUMENTS

| | | |
|---|---|---|
| JP | 57-7215 | 1/1982 |
| JP | S63-24731 | 5/1988 |
| JP | 2004-042440 | 2/2004 |
| JP | 2004-321848 | 11/2004 |
| JP | 2006-272318 | 10/2006 |
| JP | 2008-307456 | 12/2008 |
| WO | WO 94/02256 | 10/1994 |
| WO | WO 94/22556 | 10/1994 |
| WO | WO 2014/103839 A1 | 7/2014 |

OTHER PUBLICATIONS

Written Opinion in corresponding Application No. PCT/JP2014/064504, mailed Aug. 19, 2014, 5 pages.
International Search Report from the Japanese Patent Office for International Application No. PCT/JP2014/064504, mailing date Aug. 19, 2014.
International Preliminary Report on Patentability, in corresponding Application No. PCT/JP2014/064504, mailed Sep. 15, 2016, 7 pages.
First Office Action, dated Feb. 6, 2017, for counterpart Chinese Patent Application No. 201480034600.8. (19 pgs., including translation).
Office Action in Patent Application No. P2013-136587, filed Nov. 1, 2016, mailing date Nov. 8, 2016.
Extended European Search Report mailed Apr. 12, 2017, for counterpart European Application No. EP14817867.6.

* cited by examiner (a)

(b)

METHOD FOR PRODUCING HONEYCOMB STRUCTURES

CROSS-REFERENCE TO RELATED APPLICATIONS

This Application is a continuation of application Ser. No. 14/392,179, filed Dec. 23, 2015, which is a national phase application based on PCT/JP2014/064504, filed May 30, 2014, which claims the priority of Japanese patent Application No. 2012-136587, filed Jun. 28, 2013, the content of each application being incorporated herein by reference.

TECHNICAL FIELD

An aspect of the present invention relates to a method for producing honeycomb structures and also relates to a method for producing honeycomb structures in which a green honeycomb molded body is fired to produce a honeycomb structure.

BACKGROUND ART

For example, honeycomb hole structures made of ceramic and having a plurality of through-holes of a cross-section polygonal shape are conventionally known. Such honeycomb structures are used, for example, in particulate-matter-removing filters such as diesel particulate filters. In a production step of such honeycomb structures, a ceramic raw material powder is formed by extruding to produce a green honeycomb molded body. A part of through-holes in this green honeycomb molded body are closed at an end surface. A honeycomb structure is produced by firing the green honeycomb molded body with closed through-holes. Patent Literature 1 discloses a method for producing such honeycomb structures. In Patent Literature 1, a sealing material is pressed with a piston against one end of a honeycomb structure placed within a cylinder to supply the sealing material to the end of through-holes in the honeycomb structure and to close the through-holes.

CITATION LIST

Patent Literature

PTL 1: Japanese Examined Patent Publication No. S63-24731

SUMMARY OF INVENTION

Technical Problem

However, in the method in the above Patent Literature 1, sealing materials such as sealing pastes are necessary. Further, Patent Literature 1 has the problem that it requires a very troublesome step, for example, applying a sealing mask to an end surface and opening a hole at a place to be closed in the mask.

In the technical field, production methods in which sealing pastes are not needed and which can simply close the end of a honeycomb structure, and honeycomb structures obtained by those production methods have been desired.

Solution to Problem

One aspect of the present invention is a method for producing a honeycomb structure, the method comprising a closing step of joining together partition walls of a green honeycomb molded body in which a plurality of through-holes partitioned by partition walls are open to each other at the end surface of a columnar body to close a part of the through-holes, wherein the green honeycomb molded body in which a part of the through-holes are closed at the closing step includes, at the end surface, one first through-hole and four second through-holes that have a smaller opening area than the first through hole and that adjoin around the first through-hole with the partition wall provided between the first through-hole and the second through-holes.

With this construction, it is unnecessary to use sealing pastes, such as in conventional methods, and the end of honeycomb structures can be simply closed. Further, since cells are closed by welding cell walls together, when the honeycomb structure is used in diesel particulate filters, turbulence of flow of exhaust gases at the end surface on the exhaust gas supply side is reduced and pressure loss can be reduced.

In this case, the first through-hole may be octagonal, and the second through-holes may be quadrangular.

According to this construction, the first through-hole is octagonal, and the second through-holes are quadrangular. For this reason, for example, when the quadrangular through-holes adjoin every other side of the octagonal through-hole, through-holes having a different size can be arranged in the end surface.

Further, the first through-hole may have a round quadrangular shape with a corner of the quadrangle being rounded, and the second through-hole may have a quadrangular shape.

According to this construction, the first through-hole has a round quadrangular shape with the corner of the quadrangle being rounded, and the second through-hole has a quadrangular shape. For this reason, for example, when the quadrangular through-hole adjoins each of the four sides of the round quadrangular through-hole, through-holes having a different size can be arranged in the end surface.

Further, at the closing step, the second through-hole can be closed at one of the end surfaces and the first through-hole can be closed at the other end surface.

According to this construction, at the closing step, the second through-holes are closed at one of the end surfaces, and the first through-holes are closed at the other end surface. For this reason, for example, when the honeycomb structure is applied to a particulate-matter-removing filter such as a diesel particulate filter, when first through-holes having a large opening area are open while closing the second through-holes having a small opening area on an inlet side of the particulate-matter-removing filter, and the second through-holes having a small opening area are open while closing the first through-holes having a large opening area on an outlet side, the inlet side becomes wide and pressure loss in a state in which soot is deposited can be reduced.

Further, at the closing step, by inserting a closing tool into a part of a plurality of through-holes in the green honeycomb molded body, partition walls are joined together at the end surface and the through-holes can be closed.

According to this construction, at the closing step, by inserting a closing tool into a part of the plurality of through-holes in the green honeycomb molded body, the partition walls are joined together at the end surface to close the through-holes. Thus, the closing of the through-holes can very easily be carried out.

In this case, at the closing step, in closing the second through-holes, by inserting a closing tool including any one shape of a quadrangular pyramid and a quadrangular pyramid platform into the first through-hole while allowing the lateral edge of the closing tool to abut against each of the partition walls that adjoin the second through-holes, the second through-holes can be closed.

According to this construction, at the closing step, in closing the second through-holes, by inserting a closing tool including any one shape of a quadrangular pyramid and a quadrangular pyramid platform into the first through-hole while allowing the lateral edge of the closing tool to abut against each of the partition walls that adjoin the second through-holes, the second through-holes are closed. Thus, the second through-holes can easily and reliably be closed.

Further, at the closing step, in closing the first through-hole, by inserting a closing tool including any one shape of a quadrangular pyramid and a quadrangular pyramid platform into each of the second through-holes while allowing the lateral edge of the closing tool to abut against the partition walls that adjoin the first through-hole, the first through-hole can be closed.

According to this construction, at the closing step, in closing the first through-hole, by inserting a closing tool including any one shape of a quadrangular pyramid and a quadrangular pyramid platform into each of the second through-holes while allowing the lateral edge of the closing tool to abut against the partition walls that adjoin the first through-hole, the first through-hole is closed. Thus, the first through-hole can easily and reliably be closed.

Advantageous Effects of Invention

The method for producing a honeycomb structure according to one aspect of the present invention can provide a production method in which a sealing paste is not needed and which can simply close the end of the honeycomb structure, and a honeycomb structure produced by the method.

DESCRIPTION OF EMBODIMENTS

Embodiments of the present invention will be described in detail with reference to the drawings.

First Embodiment (Green Honeycomb Molded Body (Octagonal Cells and Quadrangular Cells))

Figure 1:
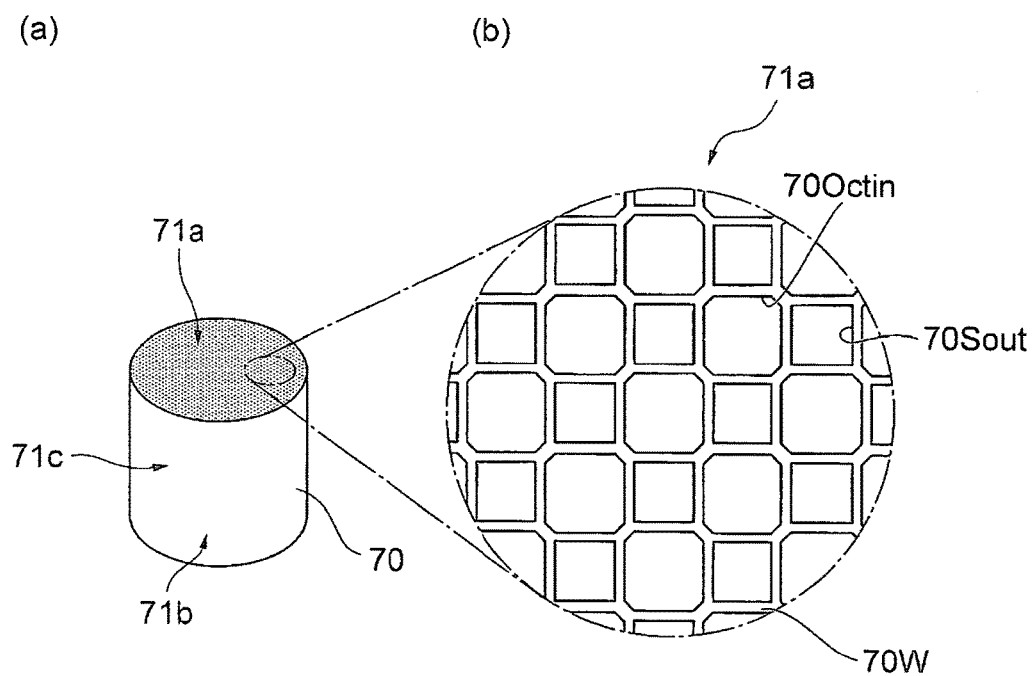
FIG. 1 is (a) a perspective view of a green honeycomb molded body according to a first embodiment before closing, with (b) a partial enlarged view of (a).

First, a green honeycomb molded body that is an object to be machined in the first embodiment of the present invention will be described. As illustrated in FIG. 1(a), a green honeycomb molded body 70 according to this embodiment is, for example, a cylindrical body that has an upper surface 71a, a lower surface 71b, and a side surface 71c, and in which a plurality of inlet-side octagonal cells 70Octin that are octagonal through-holes and a plurality of outlet-side quadrangular cells 70Sout that are quadrangular through-holes are open in the upper surface 71a and the lower surface 71b. The inlet-side octagonal cells 70Octin and the outlet-side quadrangular cells 70Sout extend substantially parallel from the upper surface 71a to the lower surface 71b along a side surface 71c. The green honeycomb molded body 70 is an unfired molded body that, by firing later, becomes a porous ceramic. Further, the length of the direction in which the inlet-side octagonal cells 70Octin and the outlet-side quadrangular cells 70Sout in the green honeycomb molded body 70 extend is not particularly limited but may be, for example, 40 to 400 mm. The outer diameter of the green honeycomb molded body 70 is also not particularly limited but may be, for example, 10 to 360 mm.

As illustrated in FIG. 1(b), in the upper surface 71a or the lower surface 71b, the inlet-side octagonal cells 70Octin having a large opening area and the outlet-side quadrangular cells 70Sout having a smaller opening area than the inlet-side octagonal cells 70Octin are partitioned by partition walls 70W. The inlet-side octagonal cells 70Octin have an octagonal shape in which the corner portion of the quadrilateral shape is further cut by a straight side. Four outlet-side quadrangular cells 70Sout are respectively adjacent to portions around one inlet-side octagonal cell 70Octin through four partition walls 70W that partition four sides except for the corner portion of the inlet-side octagonal cells 70Octin. Four inlet-side octagonal cells 70Octin are respectively adjacent to portions around one outlet-side quadrangular cell 70Sout through four partition walls 70W that partition respective sides of the outlet-side quadrangular cells 70Sout. The inlet-side octagonal cells 70Octin may not have a regular octahedral shape, and the outlet-side quadrangular cells 70Sout may not have a regular square shape. For example, the inlet-side octagonal cells 70Octin may have an octagonal shape that is long in one direction, and the outlet-side quadrangular cells 70Sout may have a rectangular shape. Further, the inlet-side octagonal cells 70Octin may have an octagonal shape in which the corner portion of a parallelogram shape is cut by a straight side, and the outlet-side quadrangular cells 70Sout may have a parallelogram shape.

It should be noted that the outer shape of the green honeycomb molded body 70 is not limited to a cylindrical shape and may be an elliptical column, an angular column (for example, a regular polygonal column such as a triangular column, a square column, a hexagonal column, or an octagonal column; or a triangular column, a square column, a hexagonal column, or an octagonal column other than the regular polygonal column) or the like. In this embodiment, a cylindrical shape of the green honeycomb molded body 70 will be described.

Such a green honeycomb molded body 70 is produced by extruding a ceramic composition with an extruder. In this case, in order to prepare a ceramic composition, a powder of an inorganic compound source which is a ceramic raw material, an organic binder, a solvent, and, if necessary, additives to be added are provided.

Inorganic compound source powders include powders containing two or more types of powders selected from the group consisting of aluminum source powders, magnesium source powders, silicon source powders, and titanium source powders; or powders containing one or more types of powders selected from any one of silicon carbide source powders, silicon nitride source powders, and aluminum nitride source powders. In order to improve heat resistance and mechanical strength of products, one or more types of any one of carbon source powders, zirconium source powders, molybdenum source powers, and calcium source powders may be added to the inorganic compound source powder. Including aluminum source powders, magnesium source powders, titanium source powders, and silicon source powders can improve heat resistance. Examples of organic binders include celluloses such as methylcellulose, carboxylmethylcellulose, hydroxyalkylmethylcellulose, and sodium carboxylmethylcellulose; alcohols such as polyvinyl alcohol; and lignin sulfonic acid salts. Additives include, for example, pore forming agents, lubricating agents and plasticizers, dispersing agents, and solvents.

The green honeycomb molded body according to this embodiment is produced by mixing the prepared raw materials with a kneader or the like to obtain a raw material mixture, and extruding the raw material mixture thus obtained through an extruder having an outlet opening corresponding to the sectional shape of the partition walls 70W.

(Ultrasonic Closing Machine)

Figure 2:
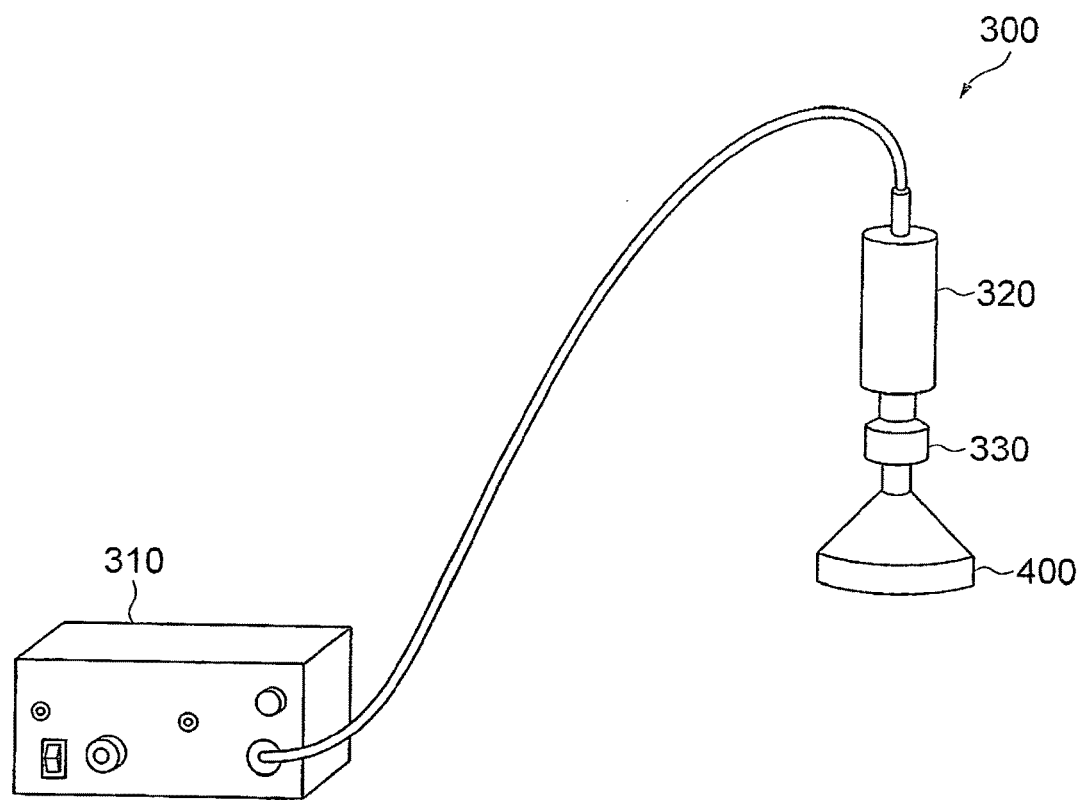
FIG. 2 is a perspective view of a closing apparatus for a green honeycomb molded body according to a first embodiment.

An ultrasonic closing machine in this embodiment will be described below. As illustrated in FIG. 2, an ultrasonic closing machine 300 in this embodiment includes an ultrasonic signal transmitter 310, an ultrasonic oscillator 320, a horn 330, and a closing tool 400. As with the above ultrasonic cutter 200, the ultrasonic signal transmitter 310 transmits electric ultrasonic signals. The ultrasonic oscillator 320 converts electric ultrasonic signals supplied from the ultrasonic signal transmitter 310 to mechanical ultrasonic vibration. The horn 330 amplifies an amplitude of the ultrasonic vibration supplied from the ultrasonic oscillator 220. The closing tool 400 is vibrated at a frequency of about 20 to 40 kHz by the ultrasonic vibration supplied from the horn 330.

(Closing Tool)

The closing tool in this embodiment will be described below. In this embodiment, closing is carried out in an identical mode at both end surfaces of the green honeycomb molded body 70 having the inlet-side octagonal cells 70Octin and the outlet-side quadrangular cells 70Sout. First, a closing tool for closing an upper surface 71a located on an exhaust gas supply side (inlet side) when the green honeycomb molded body 70 is applied to a particulate-matter-removing filter such as a diesel particulate filter after firing will be described.

Figure 3:
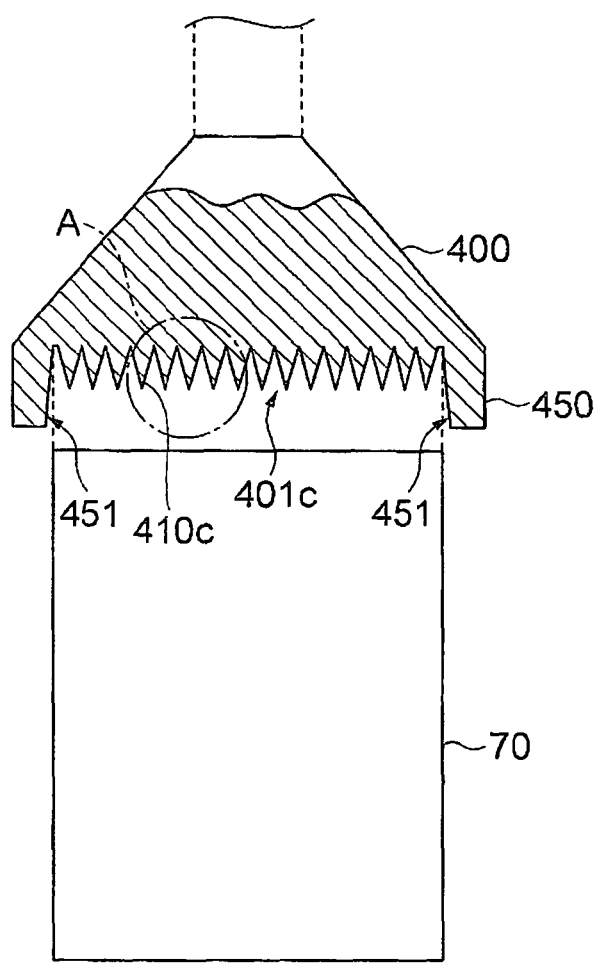
FIG. 3 is a partial cross-sectional view of a closing tool for an inlet side of a green honeycomb molded body according to a first embodiment.

As illustrated in FIG. 3, a closing tool 400 in this embodiment includes a closing surface 401a for performing closing of the green honeycomb molded body 70; and a support socket 450 in which the end of the green honeycomb molded body 70 is fitted. In the closing surface 401a, a plurality of closing projections 410a for welding partition walls 70W to each other and closing the outlet-side quadrangular cells 70Sout are provided by being arranged at positions corresponding to the inlet-side octagonal cells 70Octin and inserted respectively into the inlet-side octagonal cells 70Octin. The support socket 450 is formed of a cylindrical concave corresponding to the diameter of the green honeycomb molded body 70 to be closed. An inclined surface 451 is provided on the inner periphery of the support socket 450 in such a manner that the inner diameter of the support socket 450 increases with an increase in distance from the closing surface 401a to facilitate the insertion of the end of the green honeycomb molded body 70 into the support socket 450.

Figure 4:
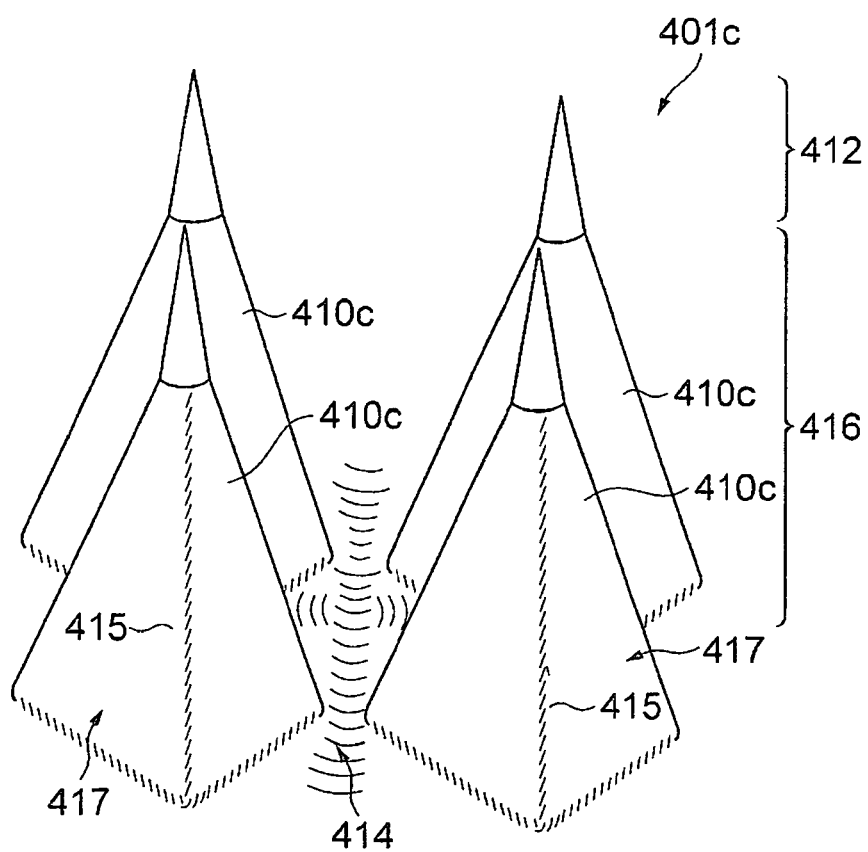
FIG. 4 is an enlarged perspective view of a portion A of FIG. 3.
Figure 5:
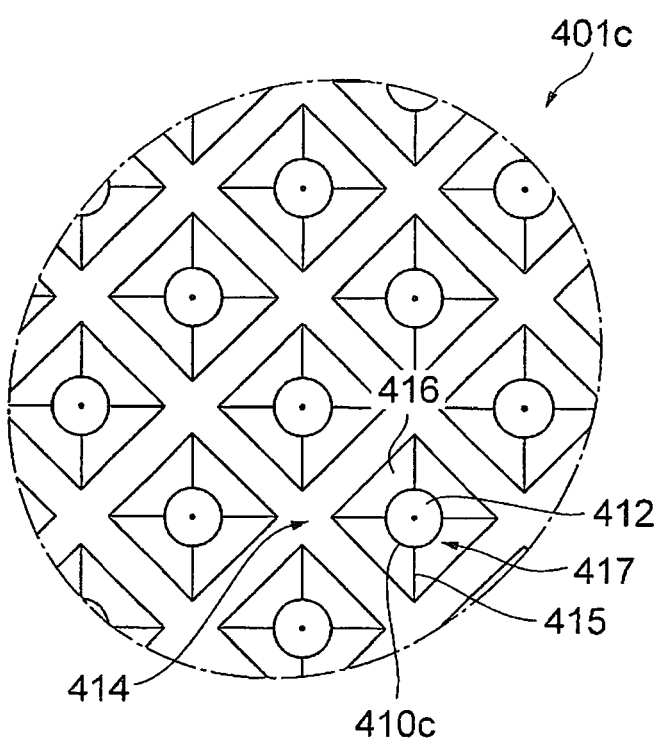
FIG. 5 is an enlarged plan view of a portion A of FIG. 3.

As illustrated in FIGS. 4 and 5 that are enlarged views of a site corresponding to a portion A in the above-described FIG. 3, the closing tool 400 in this embodiment includes closing projections 410c in a closing surface 401c of a closing tool 40 that is identical to that in the first embodiment. The closing projections 410c include a quadrangular pyramid-shaped base 416 and a conical tip 412. The quadrangular pyramid-shaped base 416 is located at a base of the closing projections 410c and is projected from the closing surface 401c. The quadrangular pyramid-shaped base 416 has a square cone platform shape in which a quadrangular pyramid reduced similarly from a quadrangular pyramid having a larger apex angle than the conical tip 412 is removed. The conical tip 412 is located at a position that is a tip of the closing projections 410c and above the quadrangular pyramid-shaped base 416. The conical tip 412 has a conical shape having a bottom surface having a size corresponding to the upper surface of the quadrangular pyramid-shaped base 416. The apex angle of the conical tip 412 is smaller than the apex angle defined by lateral edges of the square cone platform of the quadrangular pyramid-shaped base 416.

The quadrangular pyramid-shaped base 416 includes a quadrangular pyramid side surface 417 that is a side surface of the square cone platform; and a roundness chamfering lateral edge 415 on the lateral edge of the square cone platform. In the roundness chamfering lateral edge 415, roundness chamfering has been conducted at a prescribed curvature for each lateral edge of the square cone platform. Further, the valley between the quadrangular pyramid-shaped bases 416 in adjacent closing projections 410c includes a roundness chamfering valley 414 that is a concave formed by roundness chamfering at a prescribed curvature.

As illustrated in FIG. 5, in each of the closing projections 410c, apexes of conical tips 412 are arranged respectively at positions corresponding to the plurality of inlet-side octagonal cells 70Octin in the green honeycomb molded body 70. Further, in each of the closing projections 410c, the roundness chamfering lateral edge 415 of the quadrangular pyramid-shaped base 416 is arranged in a direction that abuts against the partition wall 70W. The size of each of the quadrangular pyramid-shaped bases 416 is a size such that a length that the roundness chamfering lateral edge 415 projects on the closing surface 401c from just above the closing surface 401c corresponds to a length between the center of the inlet-side octagonal cells 70Octin and the center of the outlet-side quadrangular cells 70Sout in the green honeycomb molded body 70.

It should be noted that when the green honeycomb molded body 70 is applied to a particulate-matter-removing filter such as a diesel particulate filter after firing, as with the upper surface 71a, a closing tool 400 that has a closing surface 401c with closing projections 410c arranged at positions corresponding to the outlet-side quadrangular cells 70Sout is used as the closing tool 400 for closing the lower surface 71b functioning as an exhaust gas discharge side (an outlet side).

(Closing Step)

The step of closing the green honeycomb molded body 70 in this embodiment will be described below. First, in the case where the green honeycomb molded body 70 is applied to a particulate-matter-removing filter such as a diesel particulate filter after firing, the step of closing the upper surface 71a functioning as an exhaust gas supply side (an inlet side) will be described.

Figure 6:
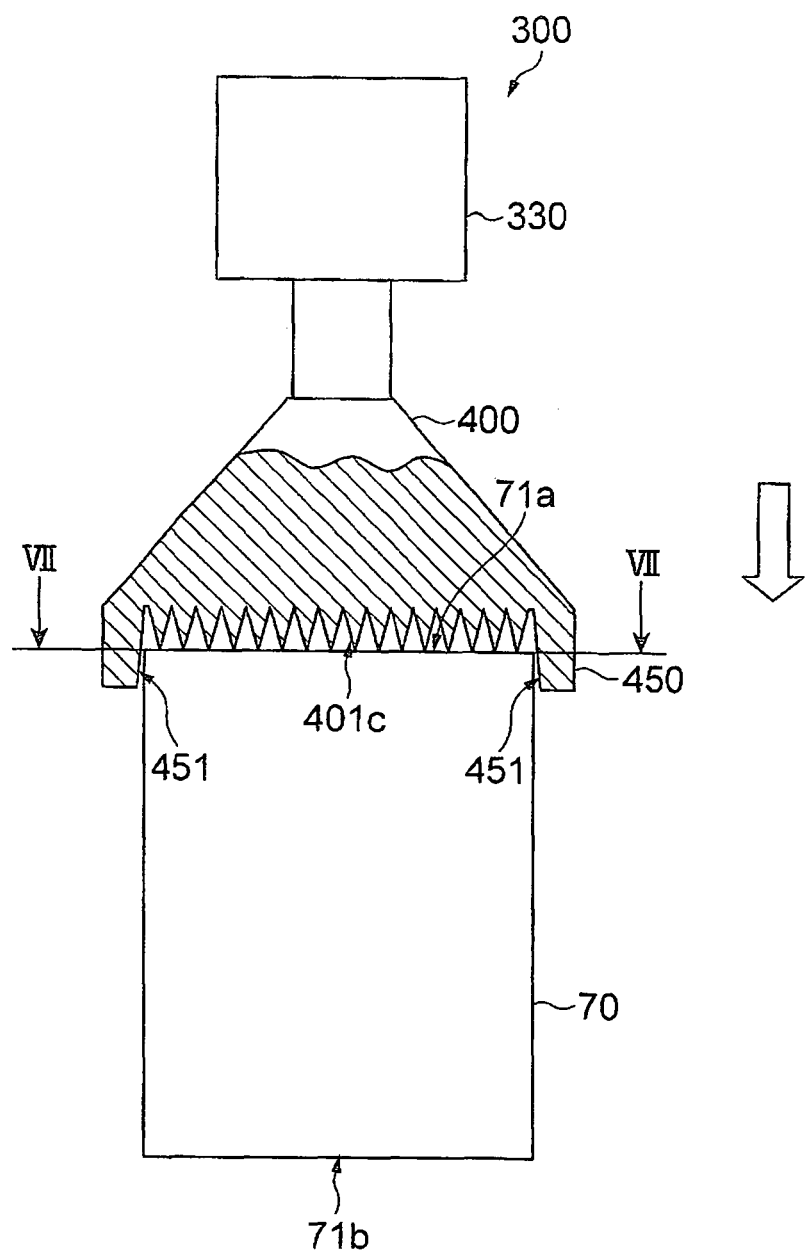
FIG. 6 is a partial cross-sectional view illustrating an initial state of a closing step on an inlet side of a green honeycomb molded body according to a first embodiment.
Figure 7:
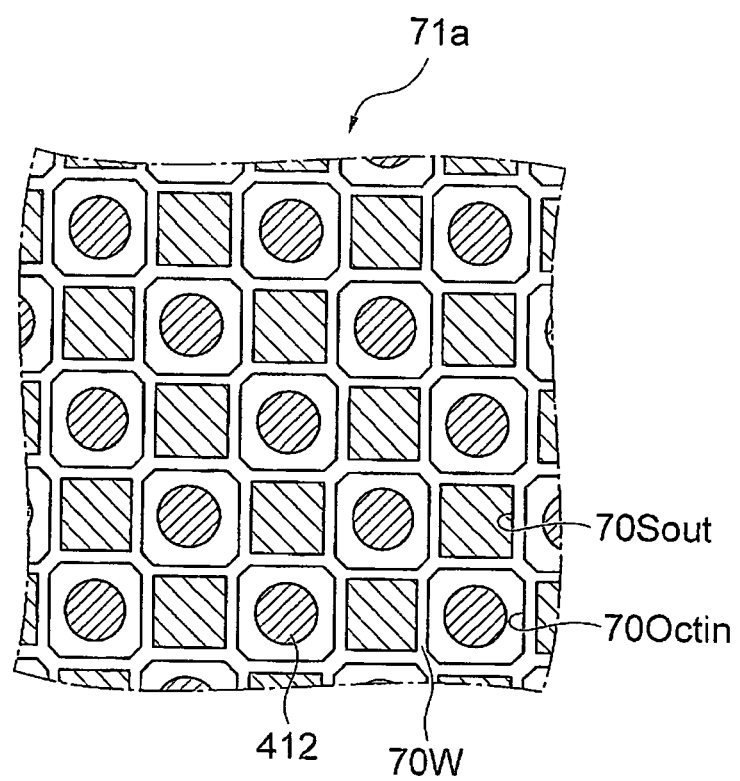
FIG. 7 is a cross-sectional view taken along line VII-VII of FIG. 6.

As illustrated in FIG. 6, the end on the upper surface 71a side of the green honeycomb molded body 70 is inserted into the support socket 450 in the closing tool 400 in the ultrasonic closing machine 300. The closing tool 400 is vibrated by ultrasonic vibration from the horn 330. As illustrated in FIG. 7, the tip of the closing projections 410c in the closing surface 401c is inserted into the inlet-side octagonal cells 70Octin. The conical tip 412 of the closing projections 410c is inserted into the inlet-side octagonal cells 70Octin.

Figure 8:
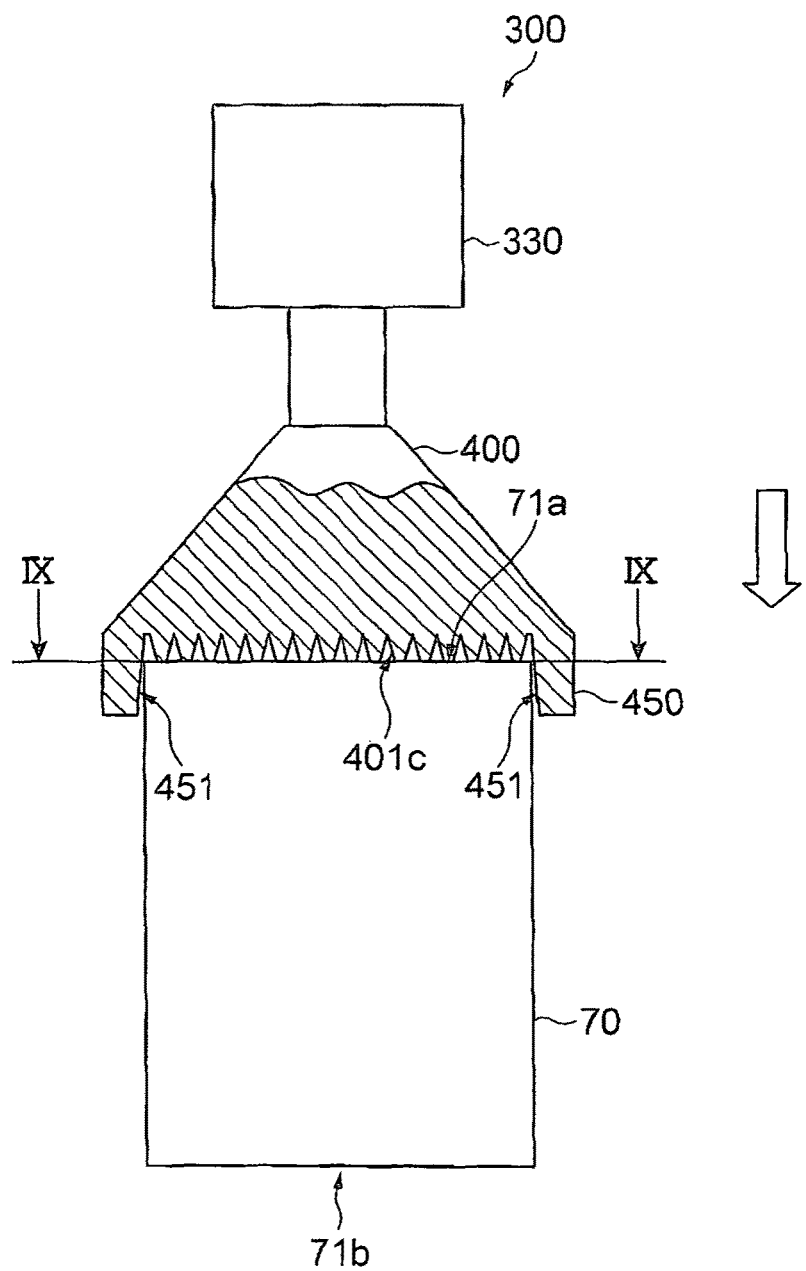
FIG. 8 is a partial cross-sectional view illustrating a middle state of a closing step in FIG. 6.
Figure 9:
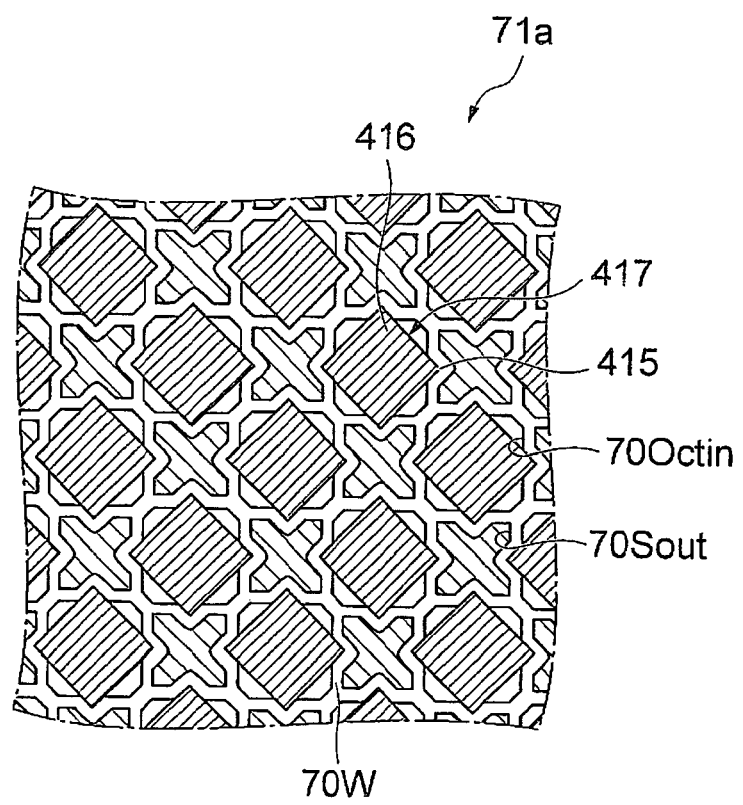
FIG. 9 is a cross-sectional view taken along line IX-IX of FIG. 8.

As illustrated in FIG. 8, when the closing projections 410c are further inserted into the inlet-side octagonal cells 70Octin, as illustrated in FIG. 9, the quadrangular pyramid-shaped base 416 of the closing projections 410c is inserted into the inlet-side octagonal cells 70Octin. The roundness chamfering lateral edges 415 in the quadrangular pyramid-shaped base 416 each abut against the partition walls 70W. Since the closing projections 410c are vibrated by ultrasonic vibration, the partition walls 70W are liquefied and pressed so as to close the outlet-side quadrangular cells 70Sout into which the closing projections 410c, that are located at the center of four inlet-side octagonal cells 70Octin into which the closing projections 410c have respectively been inserted, have not been inserted.

Figure 10:
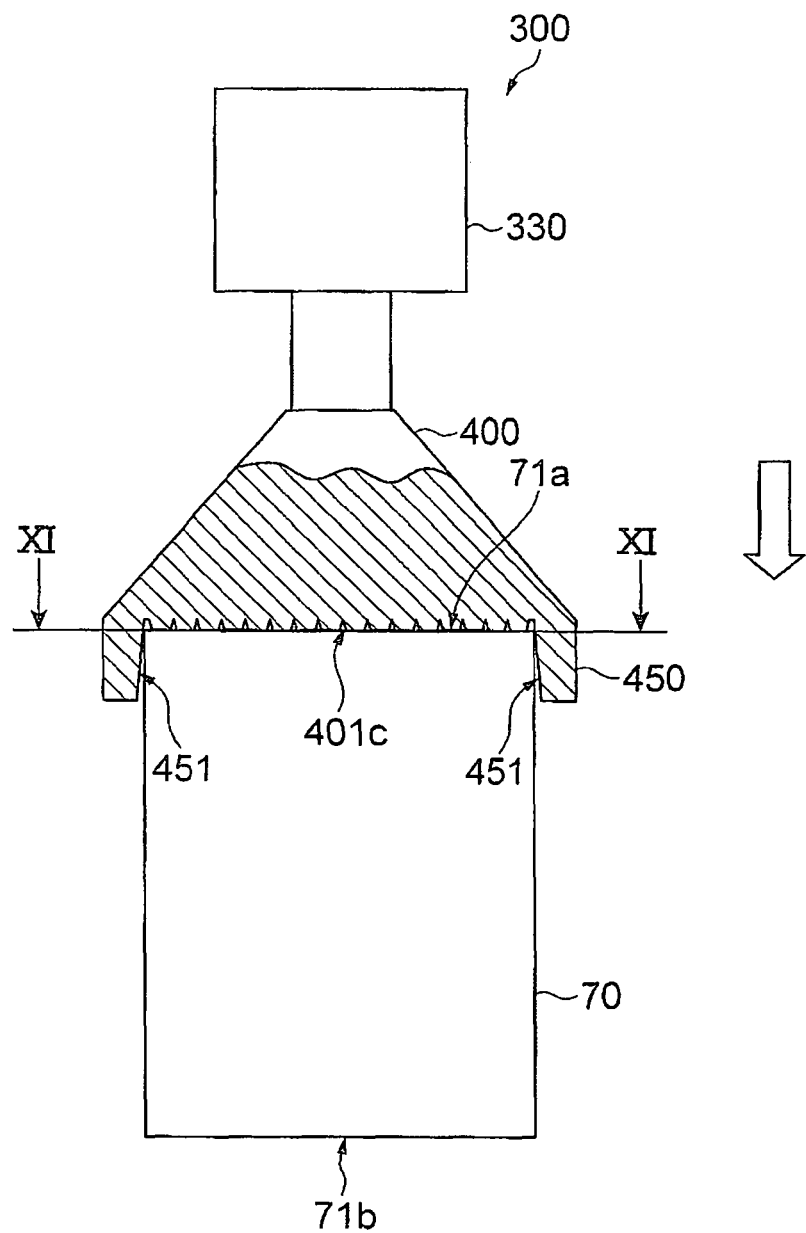
FIG. 10 is a partial cross-sectional view illustrating a final state of a closing step in FIG. 6.
Figure 11:
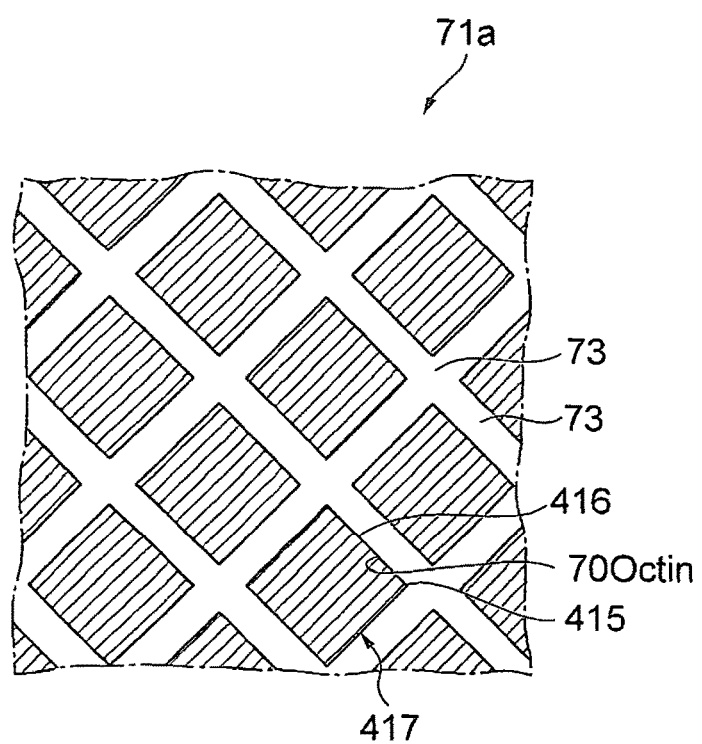
FIG. 11 is a cross-sectional view taken along line XI-XI of FIG. 10.

As illustrated in FIG. 10, when the closing projections 410c are further inserted into the inlet-side octagonal cells 70Octin, as illustrated in FIG. 11, the partition walls 70W that have been pressed from four directions while being liquefied by the roundness chamfering lateral edge 415 and the quadrangular pyramid side surface 417 in the quadrangular pyramid-shaped base 416 are integrally welded to each other. The end of the welded partition walls 70W is abutted against the roundness chamfering valley 414 in the closing surface 401c, and a round partition wall joined end 73 is formed in such a state that roundness chamfering corresponding to the shape of the roundness chamfering valley 414 has been conducted, thereby completing closing. Thus, in the upper surface 71a functioning as the exhaust gas supply side (inlet side), one outlet-side quadrangular cell 70Sout that is surrounded by four inlet-side octagonal cells 70Octin respectively adjoining the periphery of one outlet-side quadrangular cell 70Sout with the partition walls 70W provided between is closed.

Figure 12:
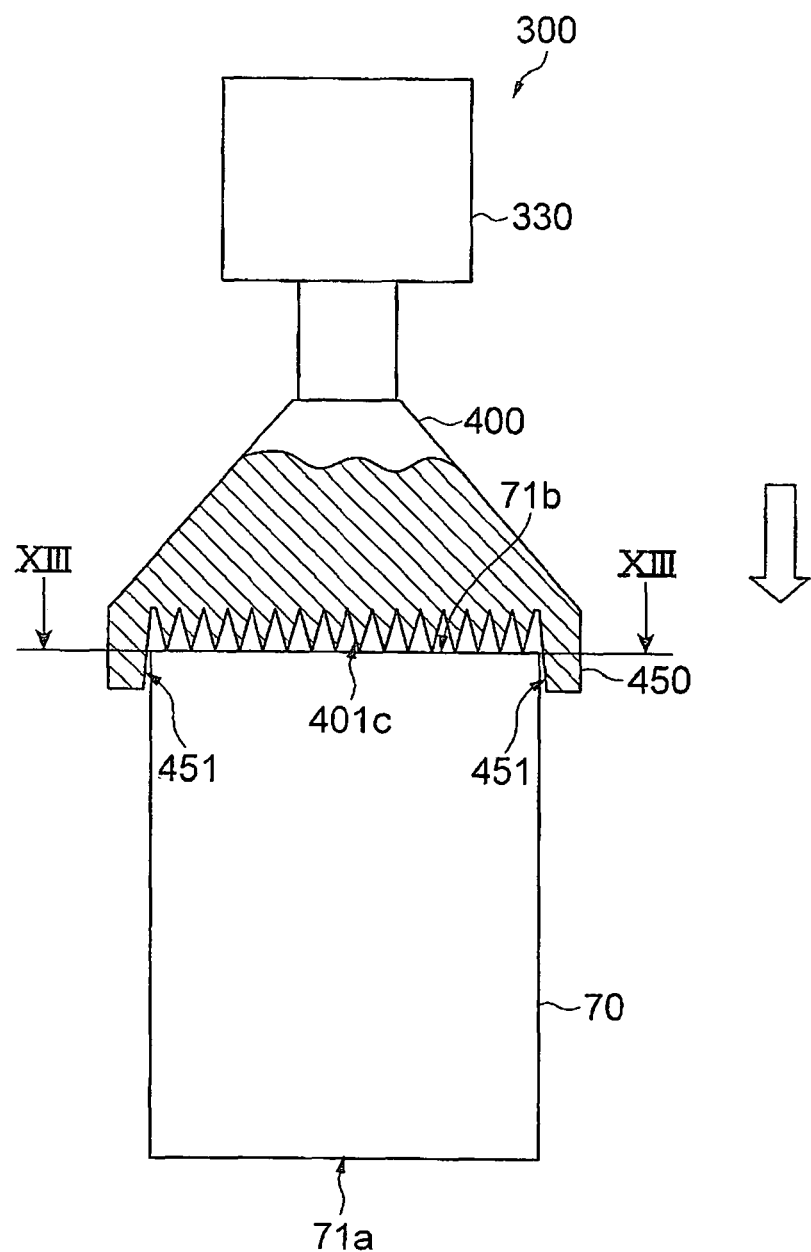
FIG. 12 is a partial cross-sectional view illustrating an initial state of a closing step on an outlet side of a green honeycomb molded body according to a first embodiment.
Figure 13:
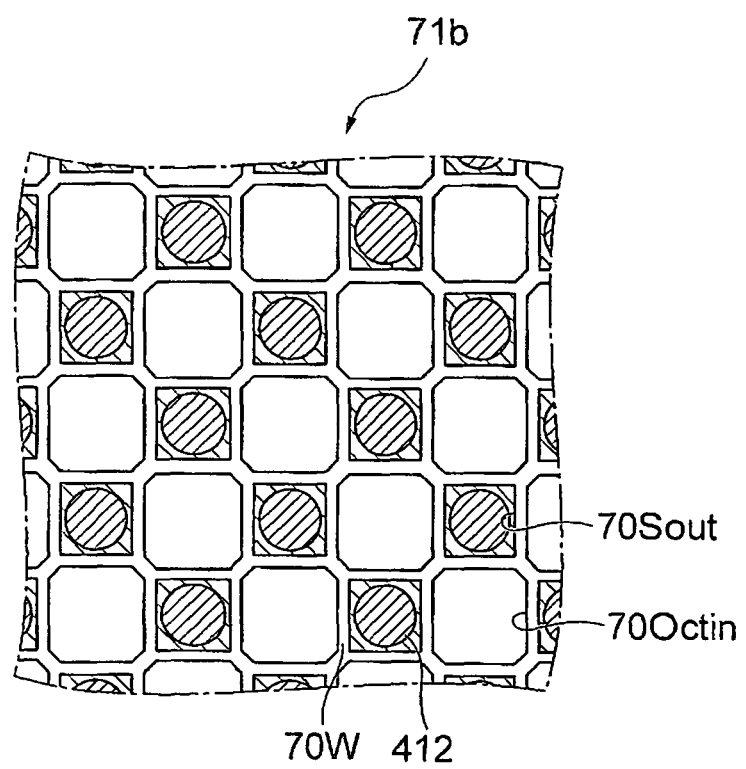
FIG. 13 is a cross-sectional view taken along line XIII-XIII of FIG. 12.

On the other hand, when the green honeycomb molded body 70 is applied to a particulate-matter-removing filter such as a diesel particulate filter after firing, for the step of closing the lower surface 71b functioning as the exhaust gas discharge side (outlet side), as illustrated in FIG. 12, the end on the lower surface 71b side of the green honeycomb molded body 70 is inserted into the support socket 450 in the closing tool 400 in the ultrasonic closing machine 300. The closing tool 400 is vibrated by ultrasonic vibration from the horn 330. The tip of the closing projections 410c in the closing surface 401c is inserted into the outlet-side quadrangular cells 70Sout. As illustrated in FIG. 13, the conical tip 412 in the closing projections 410c is inserted into the outlet-side quadrangular cells 70Sout.

Figure 14:
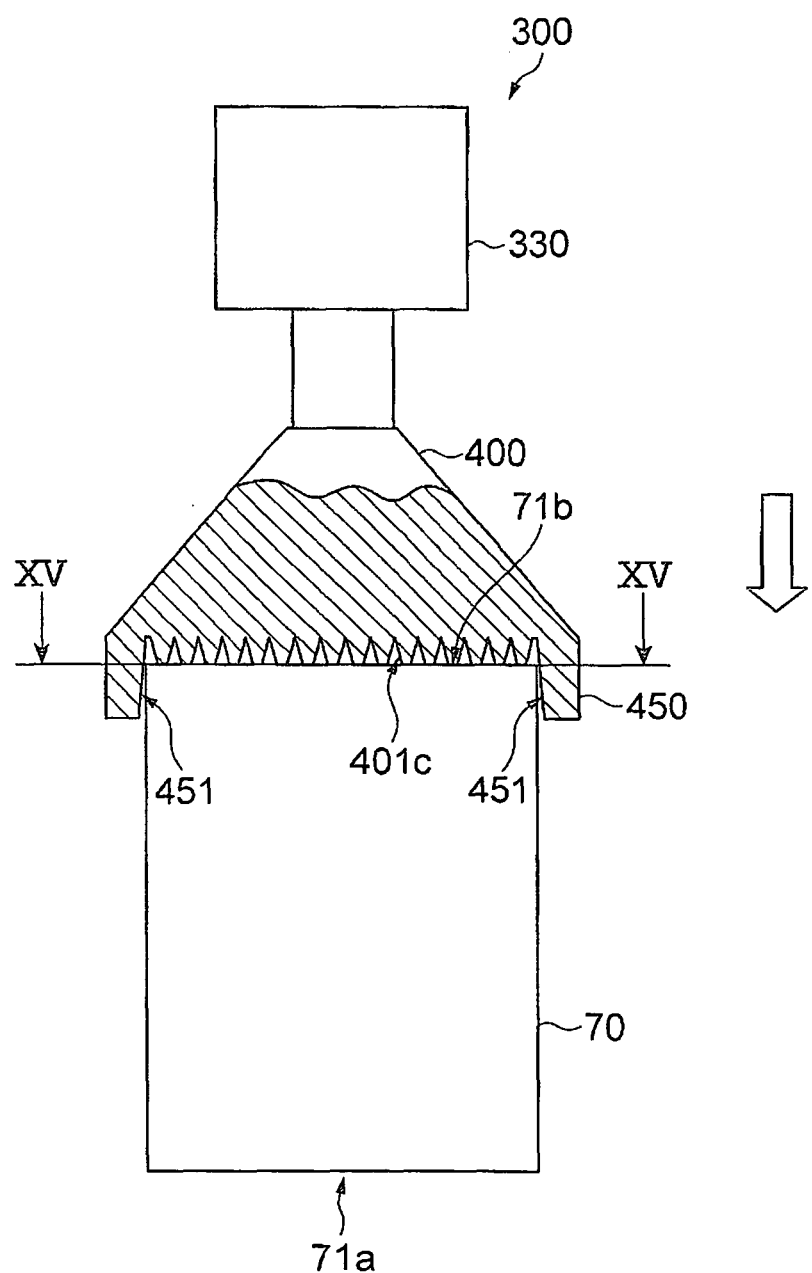
FIG. 14 is a partial cross-sectional view illustrating a middle state of a closing step in FIG. 12.
Figure 15:
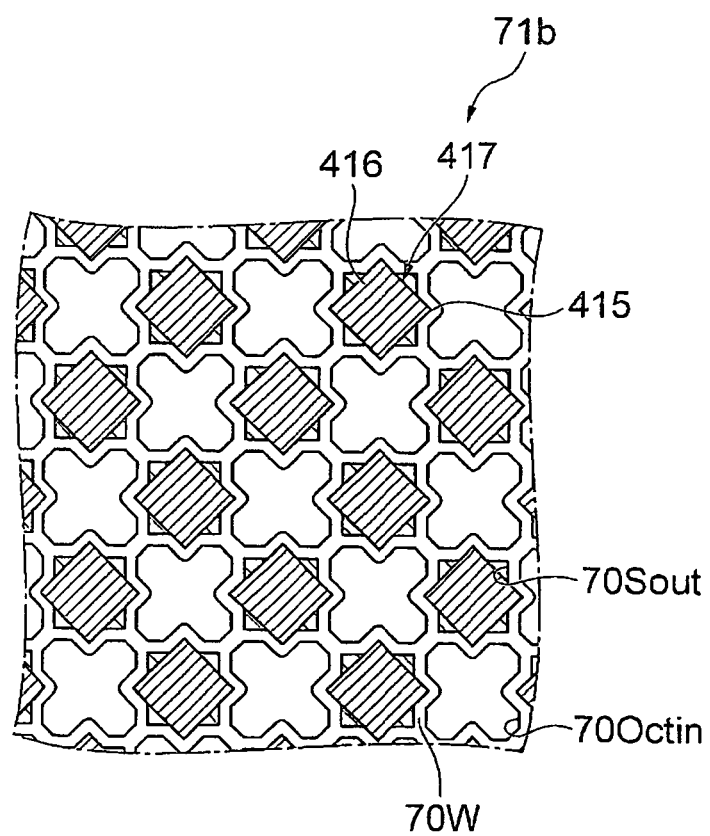
FIG. 15 is a cross-sectional view taken along line XV-XV of FIG. 14.

As illustrated in FIG. 14, when the closing projections 410c are further inserted into the outlet-side quadrangular cells 70Sout, the quadrangular pyramid-shaped base 416 in the closing projections 410c is inserted into the outlet-side quadrangular cells 70Sout, as illustrated in FIG. 15. Each of the roundness chamfering lateral edges 415 in the quadrangular pyramid-shaped base 416 is abutted against the partition walls 70W. Since the closing projections 410c are vibrated by ultrasonic vibration, the partition walls 70W are liquefied and each is pressed so as to close the inlet-side octagonal cells 70Octin into which the closing projections 410c have not been inserted and that are located at the center of the four outlet-side quadrangular cells 70Sout into which the closing projections 410c have been inserted.

Figure 16:
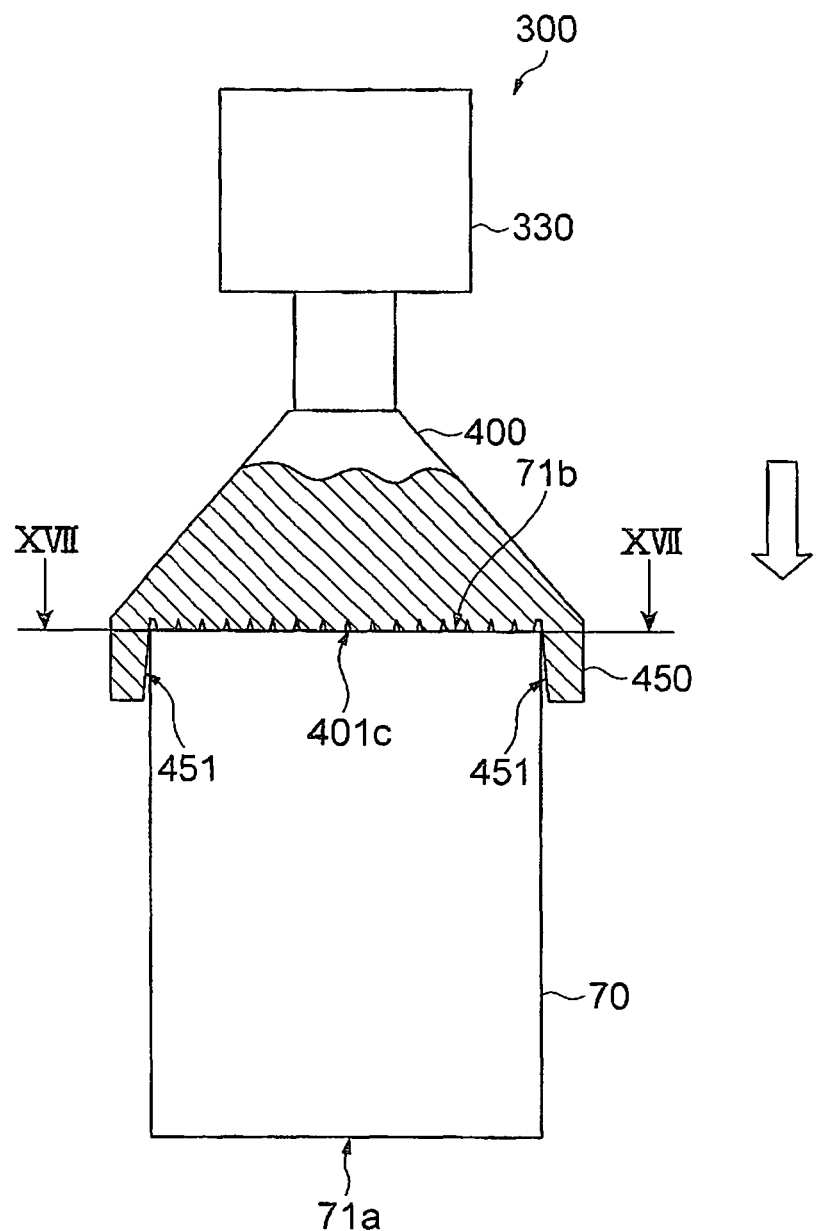
FIG. 16 is a partial cross-sectional view illustrating a final state of a closing step in FIG. 12.
Figure 17:
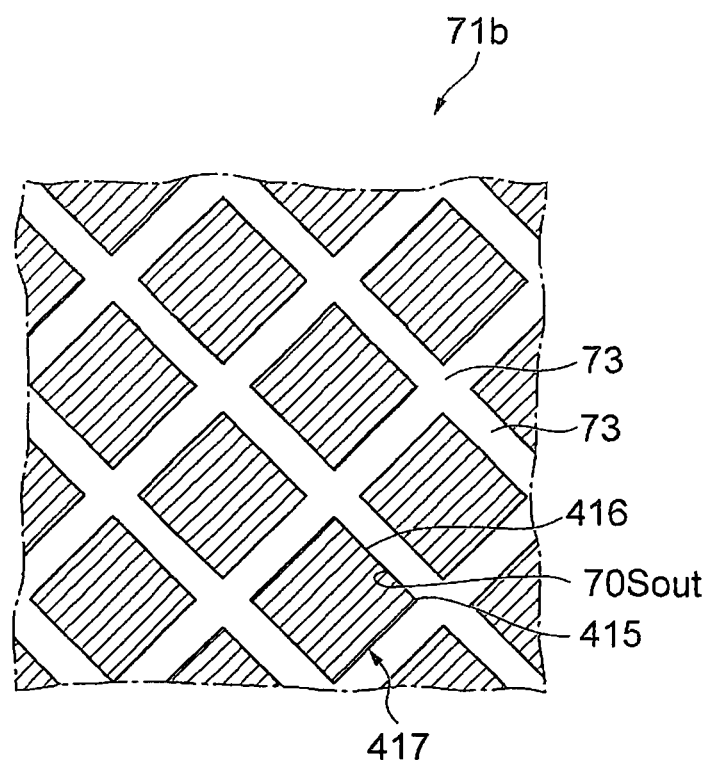
FIG. 17 is a cross-sectional view taken on line XVII-XVII of FIG. 16.

As illustrated in FIG. 16, when the closing projections 410c are further inserted into the outlet-side quadrangular cells 70Sout, as illustrated in FIG. 17, the partition walls 70W that have been pressed from four directions while being liquefied by the roundness chamfering lateral edge 415 and the quadrangular pyramid side surface 417 in the quadrangular pyramid-shaped base 416 are integrally welded to each other. The end of the welded partition walls 70W is abutted against the roundness chamfering valley 414 in the closing surface 401c, and a round partition wall joined end 73 is formed in such a state that roundness chamfering corresponding to the shape of the roundness chamfering valley 414 has been conducted, thereby completing closing. Thus, in the lower surface 71b functioning as the exhaust gas discharge side (outlet side), one inlet-side octagonal cell 70Octin that is surrounded by four outlet-side quadrangular cells 70Sout respectively adjoining the periphery of one inlet-side octagonal cell 70Octin with the partition walls 70W provided between is closed.

Figure 18:
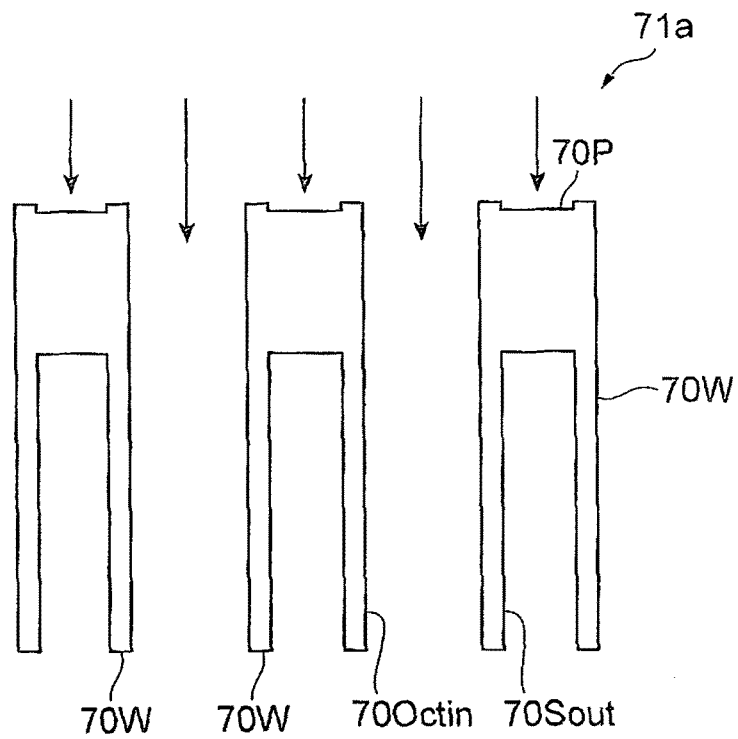
FIG. 18 is (a) a diagram illustrating flow of gas that passes through conventional closed cells, with (b) a diagram illustrating flow of gas that passes through closed cells according to an embodiment of the present invention.
Figure 18:
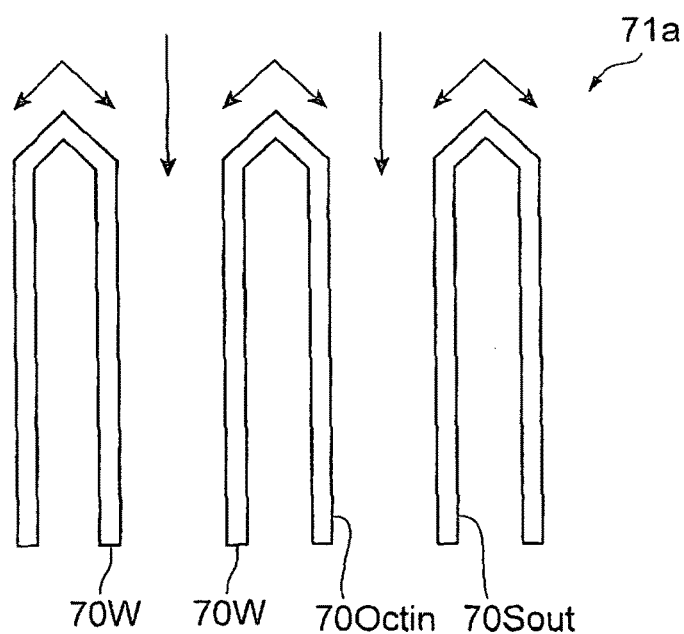

In this embodiment, in the method for producing a honeycomb structure, a plurality of inlet-side octagonal cells 70Octin and a plurality of outlet-side quadrangular cells 70Sout that have been mutually partitioned by partition walls 70W are open in an upper surface 71a and a lower surface 71b of a columnar body. The inlet-side octagonal cells 70Octin or the outlet-side quadrangular cells 70Sout are closed by joining together the partition walls 70W in the green honeycomb molded body 70, that become a honeycomb structure by firing, at the upper surface 71a and the lower surface 71b. Thereby, since the cells are closed by joining the partition walls (cell walls) 70W together, there is no need to use closing pastes such as in conventional methods. Further, since the cells are closed by welding the cell walls together, when the honeycomb structure is used in a particulate-matter-removing filter such as a diesel particulate filter, the inlet and the outlet of exhaust gas flow passages in the end surface can be made larger than an opening area of the through-holes, whereby turbulence of the flow of the exhaust gas at the end surface on the exhaust gas supply side can be reduced and pressure loss can be reduced. As illustrated in FIG. 18(a), when the outlet-side quadrangular cells 70Sout are closed with a conventional closing material 70P, there is a drawback that air resistance is large at the upper surface 71a functioning as the exhaust gas supply side (inlet side). On the other hand, as illustrated in FIG. 18(b), when the outlet-side quadrangular cells 70Sout are closed by the production method in this embodiment, since the inlet of the gas flow passage in the upper surface 71a is large and the end of the closed partition walls 70W is tapered, the air resistance can be reduced to a very high extent.

The green honeycomb molded body 70 with a part of through-holes to be closed has, in the upper surface 71a or the lower surface 71b, one inlet-side octagonal cell 70Octin and four outlet-side quadrangular cells 70Sout that have a smaller opening area than the inlet-side octagonal cell 70Octin adjoining around the one inlet-side octagonal cell 70Octin through the partition walls 70W. Accordingly, for example, when the honeycomb structure is applied to a particulate-matter-removing filter such as a diesel particulate filter, in the particulate-matter-removing filter, when the inlet-side octagonal cells 70Octin having a large opening area are opened while closing the outlet-side quadrangular cells 70Sout having a small opening area on the inlet side, and when the outlet-side quadrangular cells 70Sout having a small opening area are opened while closing the inlet-side octagonal cells 70Octin having a large opening area on the outlet side, the inlet side becomes wide and the pressure loss in such a state that soot is deposited can be reduced.

Further, the through-holes having a large opening area are inlet-side octagonal cells 70Octin and the through-holes that adjoin around the inlet-side octagonal cells 70Octin and have a small opening area are outlet-side quadrangular cells 70Sout. Therefore, when the outlet-side quadrangular cell 70Sout adjoins every other side of the inlet-side octagonal cell 70Octin, through-holes having a different size can be arranged in the upper surface 71a or the lower surface 71b.

Further, in the upper surface 71a, the outlet-side quadrangular cells 70Sout are closed, and, in the lower surface 71b, the inlet-side octagonal cells 70Octin are closed. Thus, for example, when the honeycomb structure is applied to a particulate-matter-removing filter such as a diesel particulate filter, in the particulate-matter-removing filter, when the inlet-side octagonal cells 70Octin having a large opening area are opened while closing the outlet-side quadrangular cells 70Sout having a small opening area on the inlet side, and when the outlet-side quadrangular cells 70Sout having a small opening area are opened while closing the inlet-side octagonal cells 70Octin having a large opening area on the outlet side, the inlet side becomes wide and the pressure loss in such a state that soot is deposited can be reduced.

When closing projections 410c in the closing tool 400 are inserted into the plurality of inlet-side octagonal cells 70Octin or outlet-side quadrangular cells 70Sout in the green honeycomb molded body 70, the partition walls 70W are joined together at the upper surface 71a or the lower surface 71b and the cells are closed. Thus, the closing of the cells can very easily be carried out.

Further, in the closing of the outlet-side quadrangular cells 70Sout, the outlet-side quadrangular cells 70Sout are closed by inserting closing projections 410c in the closing tool 400 including any shape of a quadrangular pyramid and a quadrangular pyramid platform into the inlet-side octagonal cells 70Octin while allowing the roundness chamfering lateral edge 415 to abut against each of the partition walls 70W that adjoin the roundness chamfering lateral edge 415. Thus, the outlet-side quadrangular cells 70Sout can be closed easily and reliably.

Further, in the closing of the inlet-side octagonal cells 70Octin, the inlet-side octagonal cells 70Octin are closed by inserting closing projections 410c in the closing tool 400 including any shape of a quadrangular pyramid and a quadrangular pyramid platform into through-holes, respectively, in the outlet-side quadrangular cells 70Sout while allowing the roundness chamfering lateral edge 415 of the closing projections 410c to abut against the partition walls 70W adjacent to the inlet-side octagonal cells 70Octin. Thus, the inlet-side octagonal cells 70Octin can be closed easily and reliably.

Second Embodiment (Green Honeycomb Molded Body (Rounded Quadrangular Cells and Quadrangular Cells))

Figure 19:
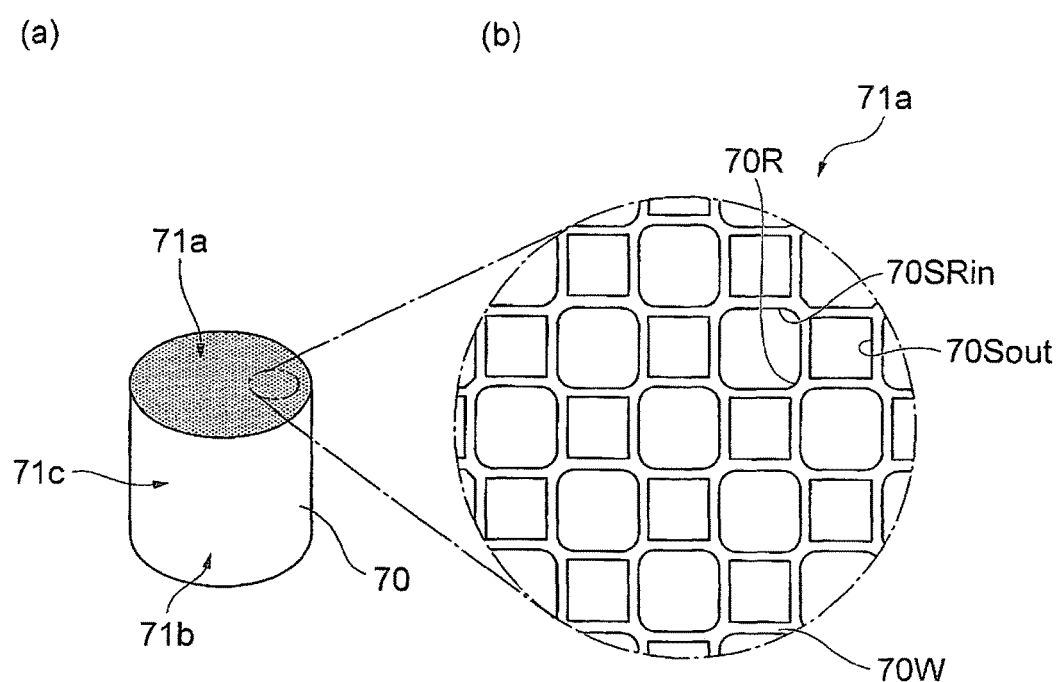
FIG. 19 is (a) a perspective view of a green honeycomb molded body according to a first embodiment before closing, with (b) a partial enlarged view of (a).

First, a green honeycomb molded body that is an object to be machined in the second embodiment of the present invention will be described. As illustrated in FIG. 19(a), a green honeycomb molded body 70 in this embodiment is, for example, a cylindrical body that has an upper surface 71a, a lower surface 71b, and a side surface 71c and in which a plurality of inlet-side rounded quadrangular cells 70SRin that are rounded quadrangular through-holes with the corner of the quadrangle being rounded, and outlet-side quadrangular cells 70Sout that are quadrangular through-holes that are the same as those in the first embodiment are open in the upper surface 71a and the lower surface 71b. The inlet-side rounded quadrangular cells 70SRin and the outlet-side quadrangular cells 70Sout extend substantially parallel from the upper surface 71a to the lower surface 71b along the side surface 71c. As with the above-described first embodiment, the green honeycomb molded body 70 is an unfired molded body that, by firing later, becomes a porous ceramic and is identical in material and production method to that in the first embodiment except for the inlet-side rounded quadrangular cells 70SRin. Further, the length of the direction in which the inlet-side rounded quadrangular cells 70SRin and the outlet-side quadrangular cells 70Sout in the green honeycomb molded body 70 extend is not particularly limited but may be, for example, 40 to 400 mm.

As illustrated in FIG. 19(b), in the upper surface 71a or the lower surface 71b, inlet-side rounded quadrangular cells 70SRin having a large opening area and outlet-side quadrangular cells 70Sout having a smaller opening area than the inlet-side rounded quadrangular cells 70SRin are partitioned by partition walls 70W. The inlet-side rounded quadrangular cells 70SRin have a rounded quadrangular shape in which the corner of the quadrangle has been roundly chamfered. Four outlet-side quadrangular cells 70Sout adjoin around one inlet-side rounded quadrangular cell 70SRin through respective four partition walls 70W that partition the four sides of the inlet-side rounded quadrangular cell 70SRin. Four inlet-side rounded quadrangular cells 70SRin adjoin around one outlet-side quadrangular cell 70Sout through respective four partition walls 70W that partition each side of the outlet-side quadrangular cells 70Sout. It should be noted that the inlet-side rounded quadrangular cells 70SRin may not be one in which the corner of a square has been rounded. For example, the inlet-side rounded quadrangular cells 70SRin may have a round quadrangular shape that is elongate in one direction. Alternatively, the inlet-side rounded quadrangular cells 70SRin may have a round quadrangular shape in which the corner of a parallelogram has been rounded.

(Closing Step)

The step of closing the green honeycomb molded body 70 in this embodiment will be described below. In this embodiment, the inlet-side rounded quadrangular cells 70SRin and the outlet-side quadrangular cells 70Sout are closed using a closing tool 400 that is the same as that in the above-described first embodiment. First, the step of closing the upper surface 71a functioning as an exhaust gas supply side (an inlet side) in the case where the green honeycomb molded body 70 is applied to a particulate-matter-removing filter such as a diesel particulate filter after firing will be described.

Figure 20:
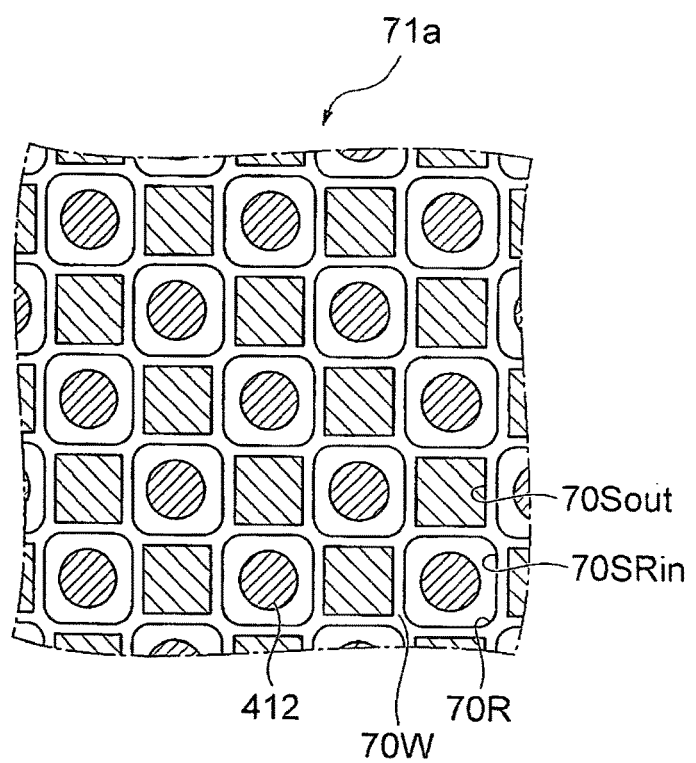
FIG. 20 is a cross-sectional view corresponding to a cross section taken along line VII-VII of FIG. 6 in a closing step on an inlet side in a second embodiment.

As illustrated in FIG. 6, the end on the upper surface 71a side of the green honeycomb molded body 70 is inserted into the support socket 450 in the closing tool 400 in the ultrasonic closing machine 300. The closing tool 400 is vibrated by ultrasonic vibration from the horn 330. As illustrated in FIG. 20, the tip of the closing projections 410c in the closing surface 401c is inserted into the inlet-side rounded quadrangular cells 70SRin. The conical tip 412 of the closing projections 410c is inserted into the inlet-side rounded quadrangular cells 70SRin.

Figure 21:
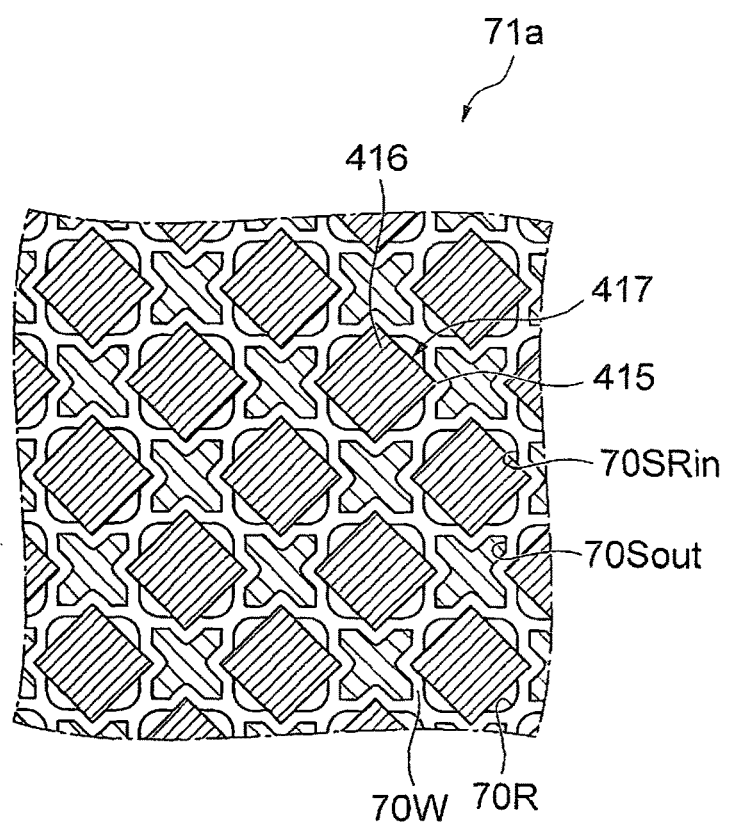
FIG. 21 is a cross-sectional view corresponding to a cross section taken along line IX-IX of FIG. 8 in a closing step on an inlet side according to a second embodiment.

As illustrated in FIG. 8, when the closing projections 410c are further inserted into the inlet-side rounded quadrangular cells 70SRin, as illustrated in FIG. 21, the quadrangular pyramid-shaped base 416 in the closing projections 410c are inserted into the inlet-side rounded quadrangular cells 70SRin. The roundness chamfering lateral edges 415 in the quadrangular pyramid-shaped base 416 each abut against the partition walls 70W. Since the closing projections 410c are vibrated by ultrasonic vibration, the partition walls 70W are liquefied and pressed so as to close the outlet-side quadrangular cells 70Sout into which the closing projections 410c have not been inserted that are located at the center of four inlet-side rounded quadrangular cells 70SRin into which the closing projections 410c have respectively been inserted.

Figure 22:
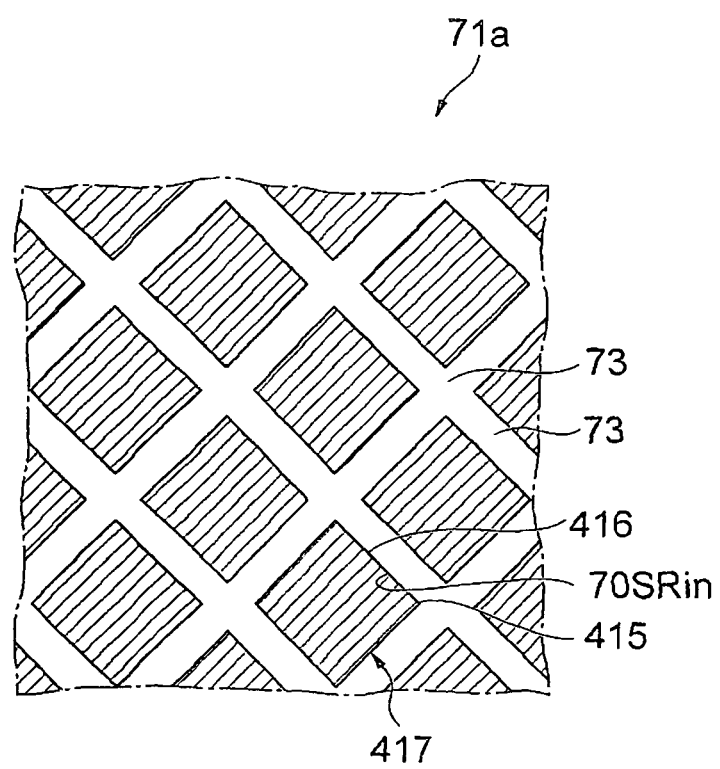
FIG. 22 is a cross-sectional view corresponding to a cross section taken along line XI-XI of FIG. 10 in a closing step on an inlet side according to a second embodiment.

As illustrated in FIG. 10, when the closing projections 410c are further inserted into the inlet-side rounded quadrangular cells 70SRin, as illustrated in FIG. 22, the partition walls 70W that have been pressed from four directions while being liquefied by the roundness chamfering lateral edge 415 and the quadrangular pyramid side surface 417 in the quadrangular pyramid-shaped base 416 are integrally welded to each other. The end of the welded partition walls 70W is abutted against the roundness chamfering valley 414 in the closing surface 401c, and a round partition wall joined end 73 is formed in such a state that roundness chamfering corresponding to the shape of the roundness chamfering valley 414 has been conducted, thereby completing closing. Thus, in the upper surface 71a functioning as the exhaust supply side (inlet side), one outlet-side quadrangular cell 70Sout that is surrounded by four inlet-side rounded quadrangular cells 70SRin respectively adjoining the periphery of one outlet-side quadrangular cell 70Sout with the partition walls 70W provided between is closed.

Figure 23:
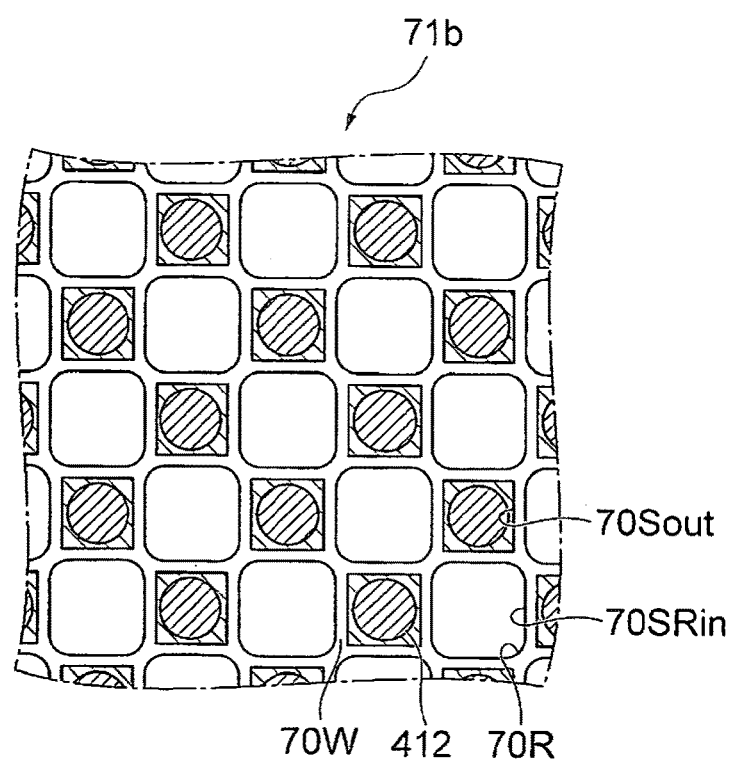
FIG. 23 is a cross-sectional view corresponding to a cross section taken along line XIII-XIII of FIG. 12 in a closing step on an outlet side according to a second embodiment.

On the other hand, when the green honeycomb molded body 70 is applied to a particulate-matter-removing filter such as a diesel particulate filter after firing, for the step of closing the lower surface 71b functioning as the exhaust gas discharge side (outlet side), as illustrated in FIG. 12, the end on the lower surface 71b side of the green honeycomb molded body 70 is inserted into the support socket 450 in the closing tool 400 in the ultrasonic closing machine 300. The closing tool 400 is vibrated by ultrasonic vibration from the horn 330. The tip of the closing projections 410c in the closing surface 401c are inserted into the outlet-side quadrangular cells 70Sout. As illustrated in FIG. 23, the conical tip 412 of the closing projections 410c is inserted into the outlet-side quadrangular cells 70Sout.

Figure 24:
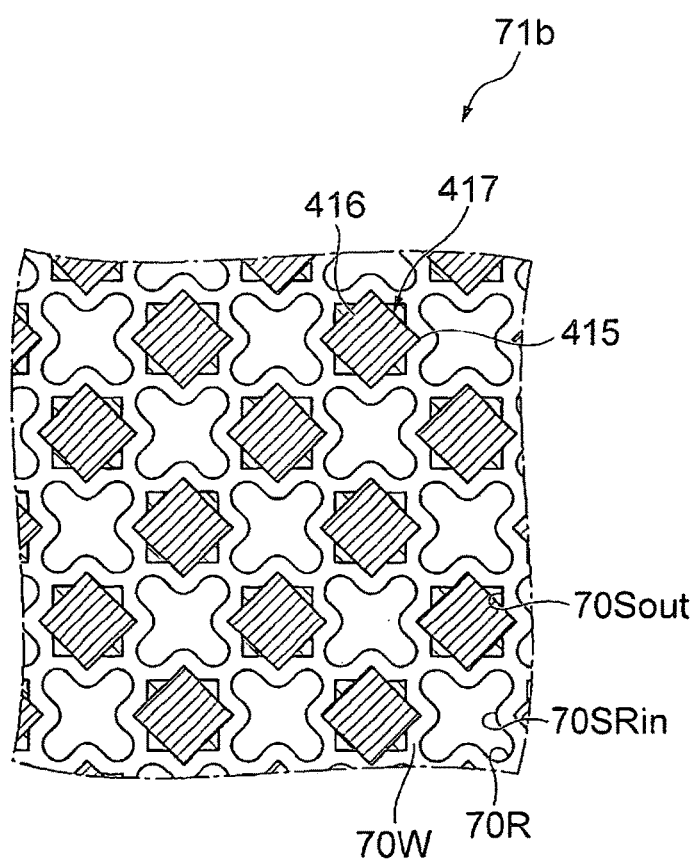
FIG. 24 is a cross-sectional view corresponding to a cross section taken along line XV-XV of FIG. 14 in a closing step on an outlet side according to a second embodiment.

As illustrated in FIG. 14, when the closing projections 410c are further inserted into the outlet-side quadrangular cells 70Sout, the quadrangular pyramid-shaped base 416 in the closing projections 410c is inserted into the outlet-side quadrangular cells 70Sout, as illustrated in FIG. 24. Each of the roundness chamfering lateral edges 415 in the quadrangular pyramid-shaped base 416 is abutted against the partition walls 70W. Since the closing projections 410c are vibrated by ultrasonic vibration, the partition walls 70W are liquefied and each are pressed so as to close the inlet-side rounded quadrangular cells 70SRin into which the closing projections 410c have not been inserted and that are located at the center of the four outlet-side quadrangular cells 70Sout into which the closing projections 410c have been inserted.

Figure 25:
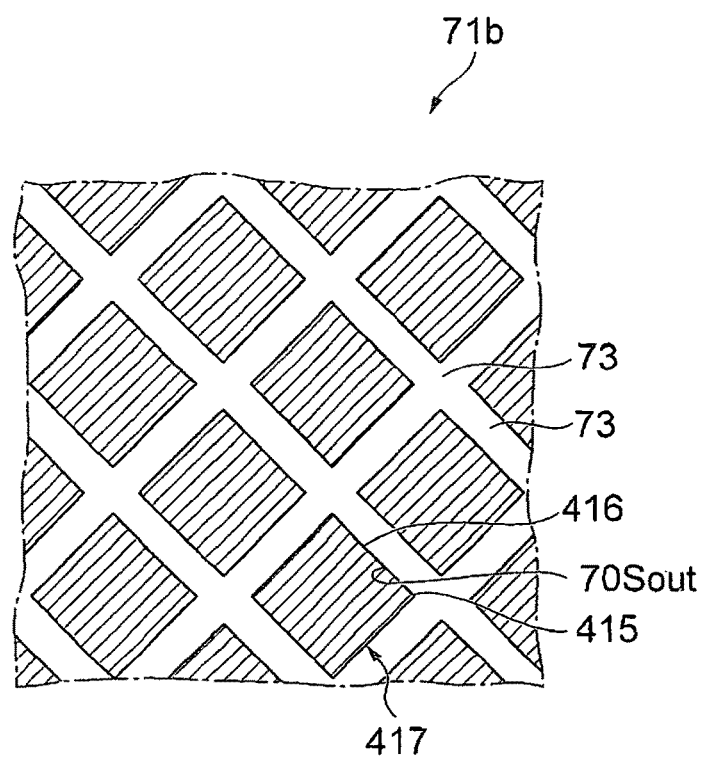
FIG. 25 is a cross-sectional view corresponding to a cross section taken along line XVII-XVII of FIG. 16 in a closing step on an outlet side according to a second embodiment.

As illustrated in FIG. 16, when the closing projections 410c are further inserted into the inlet-side octagonal cells 70Octin, as illustrated in FIG. 25, the partition walls 70W that have been pressed from four directions while being liquefied by the roundness chamfering lateral edge 415 and the quadrangular pyramid side surface 417 in the quadrangular pyramid-shaped base 416 are integrally welded to each other. The end of the welded partition walls 70W is abutted against the roundness chamfering valley 414 in the closing surface 401c, and a round partition wall joined end 73 is formed in such a state that roundness chamfering corresponding to the shape of the roundness chamfering valley 414 has been conducted, thereby completing closing. Thus, in the lower surface 71b functioning as the exhaust gas discharge side (outlet side), one inlet-side rounded quadrangular cell 70SRin that is surrounded by four outlet-side quadrangular cells 70Sout respectively adjoining the periphery of the lower surface 17b with the partition walls 70W provided between is closed.

In this embodiment, the through-holes having a large opening area are inlet-side rounded quadrangular cells 70SRin and the through-holes that adjoin around the inlet-side rounded quadrangular cells 70SRin and have a small opening area are outlet-side quadrangular cells 70Sout. Therefore, when the outlet-side quadrangular cell 70Sout adjoins every other side of the inlet-side rounded quadrangular cells 70SRin, through-holes having a different size can be arranged in the upper surface 71a or the lower surface 71b.

It should be noted that the present invention is not limited to the above embodiments, and various modifications are possible. For example, in the above embodiments, the closed green honeycomb molded body 70 has been closed by welding the partition walls 70W together through the application of ultrasonic waves. However, the closed green honeycomb molded body 70 is not limited to this embodiment. For example, the closed green honeycomb molded body 70 includes a closed green honeycomb molded body 70 that has been closed by contact bonding between partition walls 70W without the application of ultrasonic waves. Further, the closed green honeycomb molded body 70 includes a closed green honeycomb molded body 70 that has been closed by contact bonding between partition walls 70W through the application of vibration at a lower frequency than ultrasonic waves, for example, at 1 kHz or less.

INDUSTRIAL APPLICABILITY

The method for producing a honeycomb structure according to one aspect of the present invention can provide a production method in which a sealing paste is not needed and which can simply close the end of the honeycomb structure, and a honeycomb structure produced by the method.

REFERENCE SIGNS LIST

70 . . . green honeycomb molded body
71a . . . upper surface
71b . . . lower surface
71c . . . side surface
70Octin . . . inlet-side octagonal cells
70Sout . . . outlet-side quadrangular cells
70SRin . . . inlet-side rounded quadrangular cells
70W . . . partition walls
73 . . . round partition wall joined end
300 . . . ultrasonic closing machine
310 . . . ultrasonic signal transmitter
320 . . . ultrasonic oscillator
330 . . . horn
400 . . . closing tool
401c . . . closing surface
410c . . . closing projections
412 . . . conical tip
414 . . . roundness chamfering valley
415 . . . roundness chamfering lateral edge
416 . . . quadrangular pyramid-shaped base
417 . . . quadrangular pyramid side surface
450 . . . support socket
451 . . . inclined surface

The invention claimed is:

1. A method for producing a honeycomb structure comprising a plurality of through-holes that open in an end surface of a columnar body and are mutually partitioned by partition walls, a part of the plurality of through-holes having been closed, the method comprising:
   a closing step of closing a part of the through-holes by joining the partition walls in a green honeycomb molded body together at the end surface, wherein
      at the closing step, a closing tool is inserted into a part of the plurality of through-holes in the green honeycomb molded body to join the partition walls together at the end surface to close the through-holes and the closing tool includes a closing projection with a roundness chamfering lateral edge having a roundness chamfering formed at a prescribed curvature,
      the green honeycomb molded body in which a part of the through-holes are closed at the closing step includes, at the end surface, one first through-hole and four second through-holes that have a smaller opening area than the first through hole and adjoin around the one first through-hole with the partition walls provided therebetween.

2. The method for producing a honeycomb structure according to claim 1, wherein the first through-hole is octagonal and the second through-hole is quadrangular.

3. The method for producing a honeycomb structure according to claim 1, wherein the first through-hole has a round quadrangular shape with a corner of the quadrangle being rounded, and the second through-hole has a quadrangular shape.

4. The method for producing a honeycomb structure according to claim 1, wherein, at the closing step, the second through-hole is closed at one of the end surfaces, and the first through-hole is closed at another end surface.

5. The method for producing a honeycomb structure according to claim 1, wherein, at the closing step, in closing the second through-holes, the closing tool including any one shape of a quadrangular pyramid and a quadrangular pyramid platform is inserted into the first through-hole while allowing a lateral edge of the closing tool to abut against each of the partition walls that adjoin the second through-holes to close the second through-holes.

6. The method for producing a honeycomb structure according to claim 1, wherein, at the closing step, in closing the first through-hole, the closing tool including any one shape of a quadrangular pyramid and a quadrangular pyramid platform is inserted into each of the second through-holes while allowing a lateral edge of the closing tool to abut against the partition walls that adjoin the first through-hole to close the first through-hole.

* * * * *